June 13, 1939.    J. W. DAWSON ET AL    2,162,529
PHOTOSENSITIVE APPARATUS
Filed March 12, 1936    2 Sheets-Sheet 2
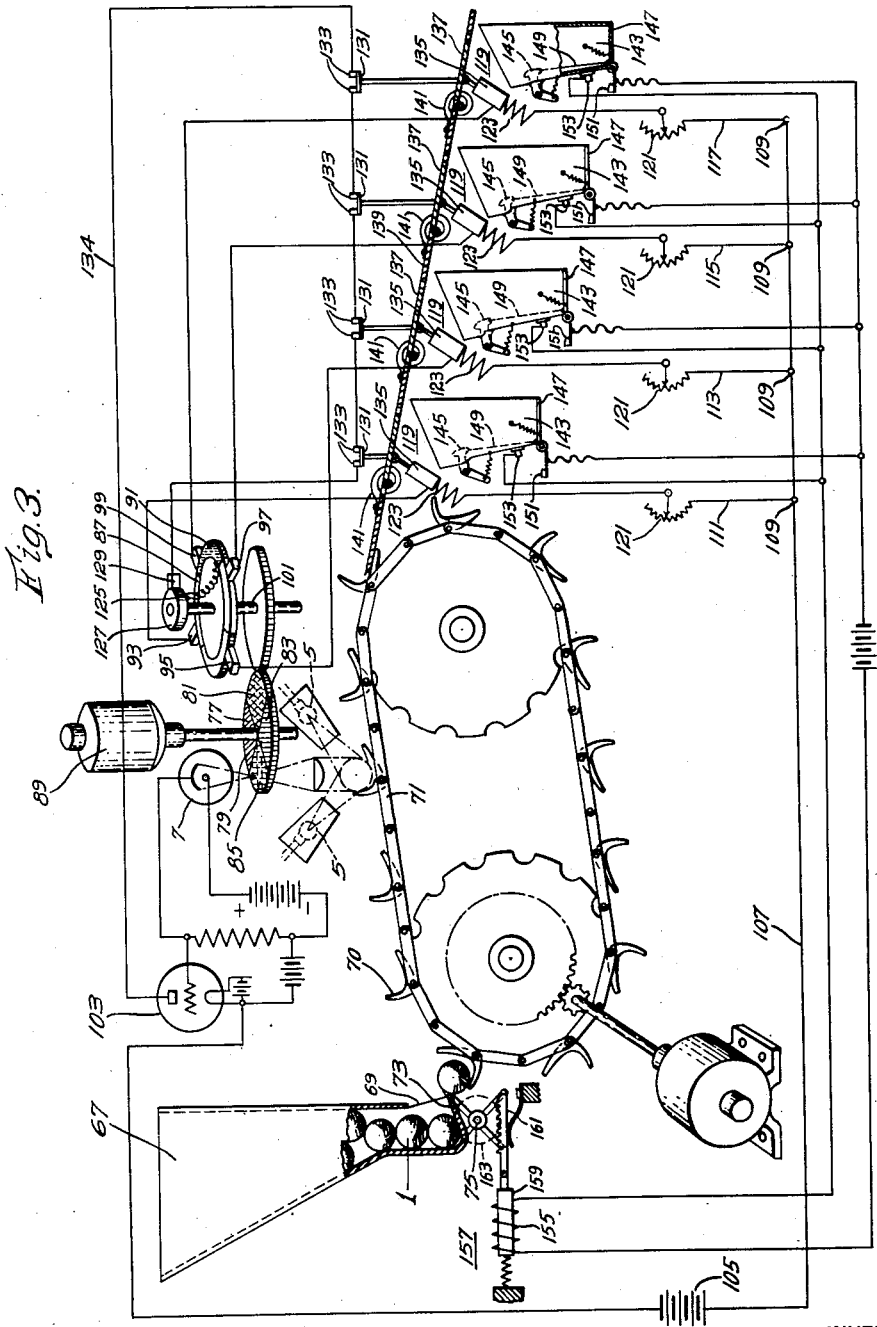
INVENTORS
John W. Dawson and
Edwin H. Vedder.
BY 
ATTORNEY Patented June 13, 1939

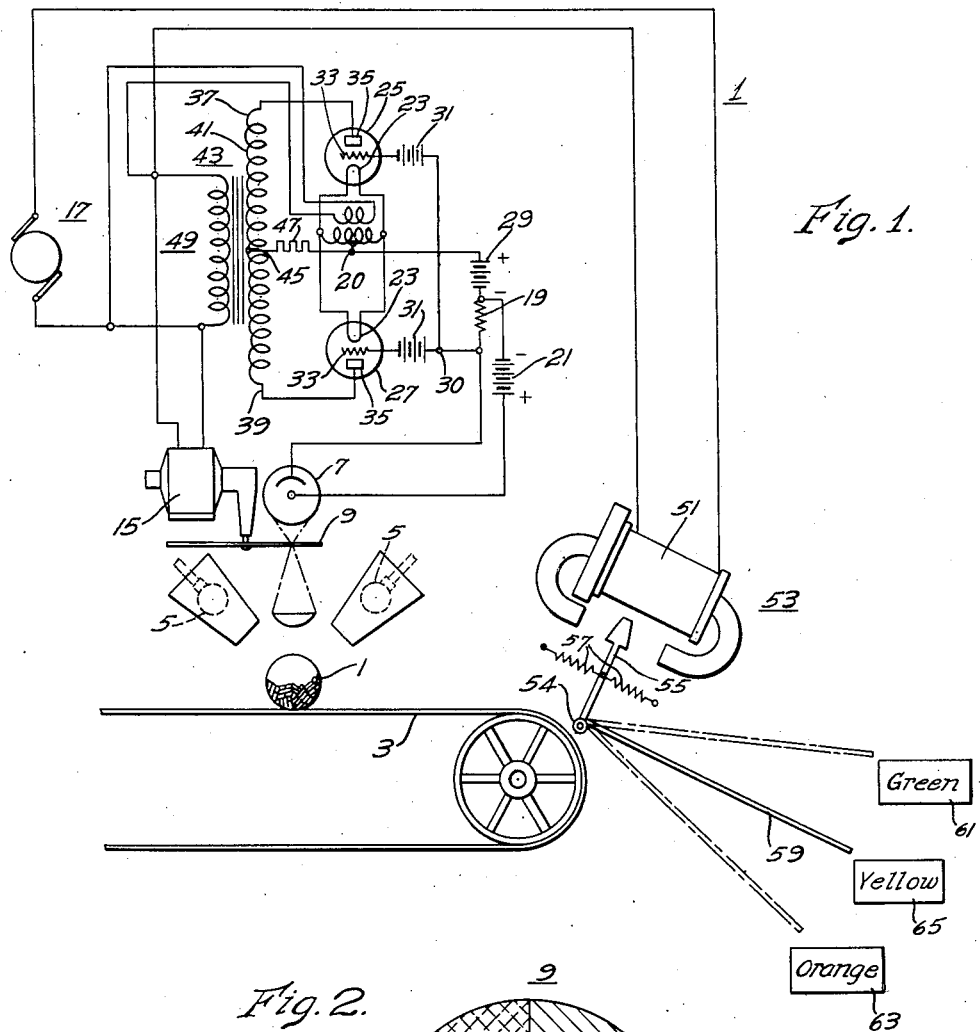
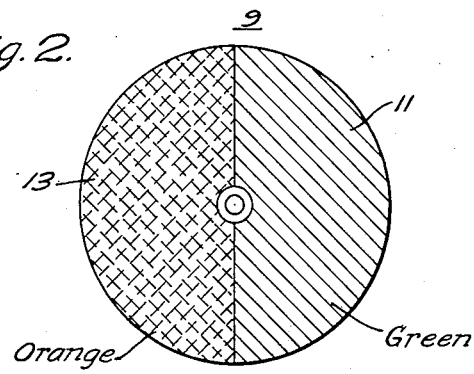

2,162,529

UNITED STATES PATENT OFFICE 2,162,529

PHOTOSENSITIVE APPARATUS

John W. Dawson, East McKeesport, and Edwin H. Vedder, Forest Hills, Pa., assignors to Westinghouse Electric & Manufacturing Company, East Pittsburgh, Pa., a corporation of Pennsylvania Application March 12, 1936, Serial No. 68,474

5 Claims. (Cl. 209—111)

Our invention relates to photo-sensitive apparatus and has particular relation to inspecting apparatus incorporating photo-sensitive devices.

It is an object of our invention to provide simple and inexpensive apparatus for classifying articles according to color.

A further object of our invention is to provide photo-sensitive apparatus incorporating only a simple photo-sensitive device for classifying articles according to color.

Another object of our invention is to provide photo-sensitive apparatus incorporating only a single photo-sensitive device for dividing articles into at least three color classifications.

More concisely stated, it is an object of our invention to provide a simple and inexpensive automatic sorting device that shall operate with precision and shall require few adjustments and replacements.

According to our invention, the radiations emitted by the article to be classified are resolved into a plurality of color components, and impulses of radiant energy corresponding to the color components are produced. The impulses are converted into electrical current impulses by a photo-sensitive device and each current impulse is in its turn transmitted through a separate current path. The current impulses actuate suitable classifying mechanisms.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is a diagrammatic view showing an embodiment of our invention;

Fig. 2 is a view in front elevation showing one of the elements utilized in the practice of our invention in accordance with Fig. 1; and Fig. 3 is a diagrammatic view showing a modification of our invention.

In Fig. 1, a system is shown which is utilized for the purpose of classifying such articles as oranges in accordance with their light reflecting properties. It may be necessary, for example, to separate the oranges into three color groups, green, yellow and orange. Accordingly, each orange 1 is disposed on a conveyor 3 and advanced thereby to a region where it is strongly illuminated by a plurality of suitable illuminating sources 5. While so-called "white light" is preferably used to illuminate the orange in the present embodiment of our invention, in certain of the modifications of our invention light lacking one or more of the primary colors or even purely monochromatic light may be used with advantage.

The radiations reflected by the orange 1 are projected onto a single photo-sensitive device 7 through a disk 9 composed of two semi-circular transparent segments 11 and 13, each capable of transmitting a different color. The color of the segments 11 and 13 should correspond to the desired classification of the oranges, and in the present case one semi-circular segment 11 should transmit green light while the other 13 should transmit orange. The disk 9 is rotated by a suitable synchronous motor 15 which in its turn is energized from a suitable alternating current source 17. The speed of the disk 9 is such that each segment thereof traverses the path of the radiant energy reflected by the orange 1 for an interval of time corresponding to a half cycle of the source.

It may be assumed for convenience that during the positive half-cycle the green segment 11 traverses the path of the radiant energy while during the negative half-cycle the orange segment 13 traverses the radiant beam. The photo-sensitive device 7 is accordingly energized by a plurality of alternate pulses of radiant energy one pulse corresponding to the green radiations emitted by the orange and the other pulse corresponding to the orange radiations emitted by the orange. The corresponding current impulses are transmitted through a network including the photo-sensitive device 7, a resistor 19 and a suitable power source 21. The resistor 19 is connected at one terminal to the common junction point 20 of the cathodes 23 of the discharge devices 25 and 27 through a biasing potential source 29 common to both discharge devices. At the other terminal, the resistor 19 is connected to the common junction point 30 of the poles of one polarity of the auxiliary biasing sources 31. The remaining poles of the sources 31 are respectively connected to the control electrodes 33 of the discharge devices 25 and 27.

The discharge devices 25 and 27 are illustrated as having hot cathodes 23. In the practice of our invention, discharge devices may also be utilized which have unexcited cathodes or cathodes of the mercury pool type. Where the load requirements are small, the discharge devices 25 and 27 may, moreover, be of the high vacuum type. In the present embodiment, the load requirements are moderately large and we prefer to use gas-filled hot cathode discharge devices.

The anodes 35 of the discharge devices 25 and 27 are connected to the terminal taps 37 and 39 of the secondary 41 of a suitable supply transformer 43 while the common junction point 20 of the cathodes 23 is connected to an intermediate tap 45 of the secondary through a suitable current-limiting resistor 47.

It will be seen that the discharge devices 25 and 27 are capable of passing current during alternate half cycles of the source 17. The magnitude of the current transmitted by each discharge device depends on the magnitude of the control potential impressed thereon and this is determined by the current transmitted through the resistor 19 common to both control circuits and to the photo-sensitive device 7 while the anode-cathode potential is positive. Accordingly, the current in a discharge device 25 or 27 will depend on the extent of excitation of the photo-sensitive device 7 during the half cycles when the anode-cathode potential of the discharge device is positive and therefore on the radiant energy transmitted by the corresponding segment 11 or 13 of the disk 9 to the photo-sensitive device during the same half cycle.

For the purpose of illustration, assume that when the top terminal 37 of the secondary 41 is positive the green segment 11 intersects the radiant energy beam from the orange 1. In such a case, a current flows through the resistor 19 common to the control circuits which corresponds to the green light reflected by the orange, while the upper discharge device 25 is capable of passing current. If the orange 1 is strongly green, a positive potential of considerable magnitude will be impressed between the control electrode 33 and the cathode 23 of the upper discharge device and this discharge device will pass a pulse of current of considerable magnitude which will persist for a half cycle. After the corresponding half period, the lower terminal 39 of the secondary becomes positive and the orange segment 13 intercepts the radiant energy. If the orange 1 is strongly green, as we have assumed above, the positive potential which is now superimposed between the control electrode 33 and the cathode 23 of the lower discharge device 27 will be comparatively small, and accordingly the lower discharge device will pass only a comparatively small current. The current flowing in one direction through the secondary 41 of the transformer 43 and the upper discharge device 25 is therefore greater than the current flowing in the opposite direction and a corresponding unbalanced condition exists in the primary circuit 49. Of course, the current through discharge device predominates if the orange is strongly orange in color and for the intermediate color, yellow, the current passed by the discharge device 25 is substantially equal to that passed by the other discharge device 27. In the former case, corresponding dissymmetry is produced in circuit 49, and in the latter case, a symmetric state exists in which the net current during any one cycle is zero.

To take advantage of this condition, the exciting coil 51 of a polarized relay 53 is connected in the primary circuit 49. The armature 55 of the relay 53 is pivotally mounted on a pin 54 adjacent to the conveyor 3. It is suspended between springs 57 so that it occupies a central position when the current in exciting coil 51 is symmetric and swings to the right or left in response to dis-symmetry in the current in the coil 51. A chute 59 is rigidly secured to the armature 55 at end adjacent to the pin 54 and extends in a direction at right angles to the longest dimension of the armature. The chute 59 also is pivotal about the pin 54 and swings upwardly or downwardly as the armature pivots to the left or right. Assume that the armature 55 swings towards the left when the current in discharge device 25 predominates, as is assumed in the above illustration. Under such circumstances, the chute 59 is swung upwardly and the strongly green orange passes from the conveyor 3 onto chute 59 and down chute 59 to a container 61 provided for green oranges. The armature swings to the right or takes a central position for the orange or yellow oranges in the same manner that it pivots to the left for green oranges and the oranges are deposited in other containers 63 and 65 according to their color. It is to be noted that the chute in its uppermost position should slope downward to facilitate the movement of the oranges. The polarized relay is provided with a time delay element which prevents the armature from reverting to the central position in the time which it takes for the orange 1 to pass from its illuminated position to one of the containers 61, 63, 65.

The apparatus shown in Fig. 1 may be utilized for classifying articles where it is desirable that the classification involve only three color groups. Let us assume now that the oranges discussed with reference to Fig. 1 are to be subdivided into four groups, green, yellow, yellowish orange and reddish orange. To accomplish this object, the apparatus shown in Fig. 3 is utilized.

The oranges 1 are deposited in a suitable delivery chute 67 and are advanced through a lateral opening 69 near the bottom of the chute 67 onto receptacles 70 provided on a chain conveyor 71 by the operation of spokes 73 extending from a rotatable shaft 75 disposed below the chute. Each orange is advanced by the conveyor 71 to a region where it is strongly illuminated by sources of radiant energy 5. In this region, the radiant energy reflected from the orange is projected through a sectored disk 77 onto a photo-sensitive device 7. Since the oranges 1 are to be classified into four groups, the disk 77 is sub-divided into four transparent quadrants 79, 81, 83 and 85 which transmit, respectively, green, yellow, yellowish orange and reddish orange. If the orange is reddish orange in color, radiations of this color reflected from the orange will be transmitted through the corresponding quadrant 85 onto the photo-sensitive device 7 while the radiant energy transmitted by the other quadrants will be small. The same principle applies for yellow, green and yellowish orange articles.

The sectored disk 77 is rotated at a high speed in synchronism with a commutator 87 by a motor 89. The commutator 87 is provided with a conducting segment 91 over one-quarter of its periphery. The other three-quarters are non-conducting. A plurality of brushes 93, 95, 97 and 99 corresponding, respectively, to the sectors 79, 81, 83 and 85 of the colored disk 77 engage the commutator 87. As the commutator rotates, the brushes 93, 95, 97 and 99 successively engage the segment 91. The commutator 87 is, moreover, so arranged on its shaft 101 that the conducting segment 91 at any instant cooperates with a brush 93, 95, 97 or 99 corresponding to the colored sector 79, 81, 83 or 85 which, at that instant, is filtering the radiant energy reflected from the orange 1.

The output of the photo-sensitive device 7 on which the reflected and filtered radiant energy is projected is amplified by a suitable discharge device 103. When a particular brush (say 99, corresponding to the reddish-orange sector 85) engages the conducting segment 91, the output current of amplifier 103 is transmitted through a circuit extending from one terminal of a power supply source 105, through a conductor 107 to a common electrical point 109 from which a plurality of similar branches 111, 113, 115, 117 extend. Each branch corresponds respectively to one of the sectors 79, 81, 83 and 85 and terminates in the corresponding brush 93, 95, 97 or 99. A relay 119 and a regulating resistor 121 is associated with each of the branches 111, 113, 115 and 117 and the exciting coil 123 of the corresponding relay 119 and the corresponding resistor 121 are in each case connected in the branch between the corresponding brush and the terminal 109.

The current can only continue through the branch 111, 113, 115 or 117 which provides a conductive path thereto, i. e., through the branch whose brush 93, 95, 97 or 99 is at the instant under observation in engagement with the segment 91. In the illustrated case, this is the branch 117 terminating in brush 99. From the segment 91, the output circuit of the amplifier 103 extends through a conductor 125 connecting segment 91 to a conducting ring 127, a brush 129 engaging the ring 127, a plurality of movable contactors 131 in series with each other, which normally engage corresponding fixed contacts 133, a conductor 134, the anode-cathode discharge path of the amplifier 103, to the other terminal of the power source 105.

Each of the contactors 131 is operable by an armature 135 of one of the relays 119 and when any one of the relays 119 is energized, the output circuit of the amplifier 103 is opened at the corresponding contactor 131.

In accordance with the magnitude of the radiant energy transmitted through a filtering quadrant 79, 81, 83, or 85 of the disk 77, a pulse of current is thus transmitted through the coil 123 of the relay 119 corresponding to the disk. The relays 119 may be of the inertial type or of the type that responds to an instantaneous current of predetermined magnitude. In the former cases, the pulses of current corresponding to each color are added in the corresponding relay coil 123 as the disk 77 and the commutator 87 rotate. Eventually, one of the relays 119 receives a totality of impulses of such magnitude that it is energized and moves its corresponding armature 135. If the relays 119 are of the type instantaneously responding to current of a predetermined magnitude, the result is similar. In this case, advantage is taken of the fact that the impulses transmitted by each of the relay coils increases as the orange 1 advances under the disk 77 and then decreases as the orange recedes at a value between the maximum and the minimum magnitudes one relay 119 operates. In both the impulse-relay case and the last-mentioned case, the point at which the relay operates is set by resistors 121.

The armatures 135 of the relays 119 are each attached to a different trapdoor 137 in the chute 139 onto which the oranges 1 are projected by the conveyor 71. The trapdoors 137 are normally maintained in closed position by closing springs 141 and when they are closed the oranges 1 pass over them in succession. They are pivoted downward by the movement of the armatures 135 and provide an opening in the chute 139 through which an orange may drop into a separating chute 143.

Accordingly, when one of the relays 119 is actuated the corresponding trapdoor 137 is opened by the movement of the armatures 135. The trapdoor 137 is pivoted downward and is latched in the open position by a latching element 145 pivotally mounted on one wall of the corresponding separating chute 143. At the same time, the movable contactor 131 of the actuated relay 119 disengages the corresponding fixed contacts 133 and opens the circuit of the amplifier tube 103 thus preventing actuation of one of the other relays 119. The orange 1 which has actuated the particular relay 119 is advanced by the conveyor 71 to the chute 13 and passes down the chute to the opening provided by the trapdoor 137 which has been opened. It falls through the opening into the corresponding separating chute 143.

The bottom of the separating chute 143 is also provided with a trapdoor 147 which is opened by the orange as it passes through the chute. The trapdoor 147 is mechanically coupled to the latching device 145 by lever 149 and as it opens it disengages the latching device 145 from the trapdoor 137 in the conveying chute 139, thus permitting the last-mentioned trapdoor 137 to return to the closed position under the action of the coil spring 141. The trapdoor 147 in the separating chute 143 also carries a movable contact element 151 which engages a corresponding fixed contact element 153 to close a circuit through the exciting coil 155 of a relay 157. The armature 159 of the last-mentioned relay 157 carries a rack 161. The rack 161 engages a pinion 163 rotatable with the shaft 75 on which the spokes 73, whereby the oranges 1 are advanced onto the conveyor 71, are mounted and one of the spokes 73 advances an orange 1 onto the conveyor 71. The above process is repeated for the orange now advanced onto the conveyor.

As has been pointed out, the regulating resistors 121 are utilized for the purpose of adjusting the operation of the relays 119. To carry out the adjusting operation, objects having colors corresponding to the standard desired are advanced on the conveyor and influence the photo-sensitive device 7. When one of these objects is advanced, the resistor 121 corresponding to its color is so adjusted that the corresponding relay 119 is operated when the light reflected from the object is approximately half of the instantaneous maximum value. The same procedure is carried out for the other colors.

It is to be noted that our invention may take a variety of forms and may have numerous applications. In particular, attention is called to the fact that while our invention has herein been illustrated as applying to classify objects according to their radiation reflecting properties, it is equally as well applicable to classification of transparent or translucent objects according to their radiation transmitting or diffusing properties.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. Apparatus for classifying an object in accordance with its color comprising means for projecting a beam of radiant energy on said object, radiant-energy responsive means, means for projecting the resultant radiant energy emitted by said object on said responsive means, means for so limiting the radiant energy that the responsive means is influenced in cyclic sequence recurring a substantial number of times by selected color components of the resultant radiant energy emitted by said object, means to be actuated by said responsive means, when it is influenced by said resultant radiant energy for producing periodically recurrent currents which are displaced in phase with respect to each other and which correspond to said different color components each cycle of said currents corresponding to a complete set of said color components and means requiring not less than a plurality of cycles of said currents for each actuation thereof for classifying said object in accordance with the relative magnitudes of said currents during said plurality of cycles.

2. Apparatus for classifying an object in accordance with its color comprising means for projecting a beam of radiant energy on said object, radiant-energy responsive means, means for projecting the resultant radiant energy emitted by said object on said responsive means, means for so limiting the radiant energy that said responsive means is influenced in cyclic sequence by two selected color components of the resultant radiant energy emitted by said object, means to be actuated by said responsive means when it is influenced by said resultant radiant energy for producing a current of one polarity to correspond to one of said color components and a current of the opposite polarity to correspond to the other of said color components, and means to be actuated in accordance with the relative magnitudes of said currents for classifying said object.

3. Apparatus for classifying an article in accordance with its color comprising means for resolving given radiations into its color components, said resolving means operating to provide impulses of radiant energy corresponding to said color components in cyclic sequence, means for subjecting said article to said resolving means in such manner that the radiations emitted by said article are resolved into a plurality of cycles of radiant energy impulses corresponding to the color components thereof, said subjecting means including means for moving said article at such a speed that a substantial number of radiant energy impulses are produced to correspond to each color component, a plurality of current paths, each current path corresponding to a particular color component resolved by said resolving means, means responsive to the color components of said article for producing current impulses in the corresponding current paths and classifying means to be actuated by a plurality of the recurring current impulses corresponding to the color component predominant in said article.

4. Apparatus for classifying an article in accordance with its color comprising means for resolving given radiations into its color component, said resolving means operating to provide impulses of radiant energy corresponding to said color components in cyclic sequence, means for subjecting said article to said resolving means in such manner that the radiations emitted by said article are resolved into a plurality of cycles of radiant energy impulses corresponding to the color components thereof, a plurality of current paths, each current path corresponding to a particular color component resolved by said resolving means, means responsive to the color components of said article for producing current impulses in the corresponding current paths, means for maintaining said current impulses in synchronism with the corresponding radiant energy impulses, and classifying means to be actuated by a plurality of the recurrent current impulses corresponding to the color component predominant in said article.

5. Apparatus for classifying an article in accordance with its color comprising means for resolving given radiations into its color components, means for subjecting said article to said resolving means in such manner that the radiations emitted by said article are resolved into color components, a plurality of current paths, each current path corresponding to a particular color component resolved by said resolving means, means responsive to the color components of said article for producing periodic currents in the corresponding current paths, a plurality of cycles of current being produced for each component and classifying means to be actuated by the currents in said current paths, said classifying means including a relay element in each current path to be actuated by the current pulses in said path, each of said relay elements being of the type that retains the effect of a current impulse and operates when a totality of current impulses impressed thereon attains a predetermined value.

JOHN W. DAWSON.
EDWIN H. VEDDER.